UNITED STATES PATENT OFFICE 1,947,997

PRODUCTS OF DIMETHYLOLUREAS

Martin Luther, Mannheim, Germany, assignor to I. G. Farbenindustrie Aktiengesellschaft, Frankfort-on-the-Main, Germany, a corporation of Germany No Drawing. Application March 21, 1928, Serial No. 263,589, and in Germany March 22, 1927

2 Claims. (Cl. 260—3)

The present invention relates to the production of condensation products of dimethylolureas.

There has been already proposed a process according to which the condensation of urea and formaldehyde is effected in an aqueous solution of permanently weak acid character (pH=4—7), preferably in the presence of suitable buffer substances; whereupon most of the water is removed at temperatures not exceeding 50° C., and preferably by distillation in vacuo, the product being hardened at from 50 to 100° C., if it is desired to convert the products into solid masses.

I have now found that in the above mentioned process, the said components may be advantageously replaced by dimethylolurea, its derivatives such as its methyl ethers, substitution products, for example dimethylolthiourea. Products of vitreous character are thereby obtained. For the sake of brevity, these compounds, which are equivalents for the purpose of the present invention, will be referred to as

$$RO—CH_2—NH—CX—NH—CH_2—OR_1$$

in which formula R and $R_1$ may be hydrogen, or alkyl or aryl radicles and X may be oxygen or sulphur in the claims. The condensation is effected in a few minutes by warming the aqueous solution or suspension, which is maintained at a constant hydrogen-ion concentration of pH=4—7. According to this method of working the process may be rendered continuous, all that is necessary being to pass the solution or suspension of the dimethylolurea continuously through a reaction chamber maintained at the boiling temperature of the said solution or suspension, and then to conduct the product into a vacuum roller drier, in order to recover it in any desired concentration as a viscous mass, which is of glass-like appearance and can be molded.

If, instead of the solid condensation products, thin solutions are desired, which for example, may be used as lacquers and the like, it is preferable to replace the water by such organic solvents, as contain not more than one hydroxyl group. The present process is especially advantageous in the preparation of lacquers, owing to the fact that the products obtained are always uniform.

The following examples will further illustrate the nature of the said invention which however is not limited thereto. The parts are by weight.

Example 1

An aqueous solution or suspension of 1 part of dimethylolurea, to which 0.005 part of a mixture of 4 parts of primary and 1 part of secondary sodium phosphate has been added as condensing agent, is passed through a pipe with a plurality of windings, which is heated to the boiling temperature of the water, the rate of flow being regulated so that the solution takes about 5 to 10 minutes to pass through the apparatus. Complete condensation occurs, and the mixture is discharged into a vacuum drier, in which it is dehydrated either to the condition of a pressable powder, or to a product which is still fluid in the warm.

Example 2

A suspension of 500 parts of dimethylolurea in 700 parts of iso-butanol together with 5 parts of primary and 1 part of secondary sodium phosphate is pressed through a system of pipes which are heated to about 100° to 110° C. by means of a heating bath. After leaving the apparatus, the solution is neutralized with an alkaline agent, such as about 10 parts of soda or about 10 parts of sodium acetate, and clarified by centrifuging. Instead of dimethylolurea, dimethylolthiourea can be employed, similar products being obtained thereby.

What I claim is:

1. The process of producing condensation products which comprises heating dimethylolurea mixed with an aliphatic monohydric alcohol together with a buffer substance maintaining a hydrogen-ion concentration of about pH6.

2. The process of producing condensation products, which comprises heating a substance selected from the class consisting of dimethylol urea, its methyl ethers, and dimethylol thiourea mixed with an aliphatic monohydric alcohol, together with a buffer substance maintaining a hydrogen-ion concentration of about pH4 to 7.

MARTIN LUTHER.